US008238502B2

(12) United States Patent
Magagni et al.

(10) Patent No.: US 8,238,502 B2
(45) Date of Patent: Aug. 7, 2012

(54) COMMUNICATION SYSTEM BETWEEN A FIRST AND A SECOND SYNCHRONOUS DEVICE THAT ARE UNCORRELATED IN TIME

(75) Inventors: Luca Magagni, Bologna (IT); Luca Ciccarelli, Rimini (IT); Alberto Fazzi, Eindhoven (NL); Roberto Canegallo, Rimini (IT); Roberto Guerrieri, Bologna (IT)

(73) Assignee: STMicroelectronics S.r.l., Agrate Brianza ( * ) Notice: Subject to any disclaimer, the term of this patent is extended or adjusted under 35 U.S.C. 154(b) by 834 days.

(21) Appl. No.: 12/345,459

(22) Filed: Dec. 29, 2008

(65) Prior Publication Data

US 2009/0168860 A1    Jul. 2, 2009

(30) Foreign Application Priority Data

Dec. 31, 2007   (IT) .............................. MI2007A2450

(51) Int. Cl.
*H04L 7/00* (2006.01)
(52) U.S. Cl. ...................................................... 375/368
(58) Field of Classification Search .................. 375/226, 375/354, 368; 714/738, 718, 734
See application file for complete search history.

(56) References Cited

U.S. PATENT DOCUMENTS

| 5,256,912 | A | * | 10/1993 | Rios .............................. 327/144 |
| 5,418,407 | A | | 5/1995 | Frenkil |
| 6,067,335 | A | | 5/2000 | Yamanoi et al. |
| 6,347,387 | B1 | * | 2/2002 | Fischer ......................... 714/738 |
| 6,493,819 | B1 | | 12/2002 | Mahurin et al. |
| 6,690,203 | B2 | | 2/2004 | Nyström et al. |
| 6,711,089 | B2 | | 3/2004 | Ong |
| 7,245,684 | B2 | | 7/2007 | Adkisson |
| 2005/0265064 | A1 | * | 12/2005 | Ku et al. ....................... 365/120 |
| 2007/0092011 | A1 | | 4/2007 | Ciccarelli et al. |
| 2007/0121767 | A1 | | 5/2007 | Yamazaki |

* cited by examiner

*Primary Examiner* — David C. Payne
*Assistant Examiner* — Wednel Cadeau
(74) *Attorney, Agent, or Firm* — Seed IP Law Group PLLC (57) ABSTRACT

A communication system includes first and second independently clocked devices, comprising, for each device, a transmitter and a receiver connected to each other in a crossed way in correspondence of an inter-chip communication channel. The communication system further comprises a synchronizer in turn including at least a first and a second synchronization block, having respective input terminals connected to the receivers and respective output terminals connected to the transmitters and comprising at least: a test pattern generator that generates a programmable test pattern signal; a pattern detector to check a matching between stored and received test pattern signals and thus lock corresponding clock phases of the synchronization blocks in case of positive result of this check; and a delay block able to change the clock phases until a synchronized condition of the synchronization blocks is verified, this synchronized condition corresponding to a matching between stored and received test pattern signals.

16 Claims, 4 Drawing Sheets

COMMUNICATION SYSTEM BETWEEN A FIRST AND A SECOND SYNCHRONOUS DEVICE THAT ARE UNCORRELATED IN TIME

BACKGROUND

1. Technical Field

The present invention relates to a communication system between first and second independently clocked devices, for example, first and second chips.

The invention particularly, but not exclusively, relates to a chip-to-chip communication system for a stacked device, i.e., a device comprising at least two chips assembled in a three-dimensional (3D) stacking configuration and the following description is made with reference to this field of application for convenience of explanation only.

2. Description of the Related Art

As it is well known, the development of stacking technology for heterogeneous device integration has recently increased in importance.

Stacking of chips, in which two or more integrated circuits or ICs of different types are placed one on the top of the other in a same package, is an alternative to silicon integration and provides improvements at the system design level in terms of size, cost, speed, power consumption and ease of application for a wide variety of products.

However, a successful implementation of the stacking or 3D technology deals with state-of-the-art of assembly processes such as wafer back-grinding, handling, die attach, wirebond and alignment. So, the choice of a stacking or 3D technology depends largely on the application of the final chip to be obtained.

It should be also emphasized that a correct and enhanced chip-to-chip communication in a stacked device is a fundamental feature to be guaranteed, in particular in the scenario of the so-called Systems-on-Chip and Systems-in-Package.

In this field, synchronization is a key issue for modern integrated systems where the distribution of a global clock signal is not possible or not advisable given the complexity of the systems themselves. In particular, the so-called Globally Asynchronous Locally Synchronous (GALS) approach is important for application to 3D communication systems where clock transmission can be a difficult task at extremely high frequencies but where communication occurs through sampled inter-chip packets.

Asynchronous to synchronous synchronizers and particularly a technique which involves level shifting of a metastable voltage either within a synchronizer stage or between synchronizer stages are described for instance in the U.S. Pat. No. 5,418,407 issued on May 23, 1995 to Frenkil (VLSI Technology Inc.).

Also known from the U.S. Pat. No. 5,256,912 issued on Oct. 26, 1993 to Rios (Sun Microsystems Inc.) is a synchronizer using a plurality of clock signals generated by a specialized clock circuit, in conjunction with synchronizer modules incorporating transparent latches, to synchronize signals passing from a first clock domain to a second clock domain.

Other system and method for synchronizing data are described in the U.S. Pat. Nos. 6,690,203; 7,245,684; 6,711,089; 6,493,819; 6,067,335; and 5,256,912.

These known communication circuits are substantially based on very simple driver models, but require sense-amplifiers and biasing blocks for the generation of internal voltage values, in particular in the receiver. So, these known communication circuits show a great power consumption due to short-circuit currents.

Figure 1:
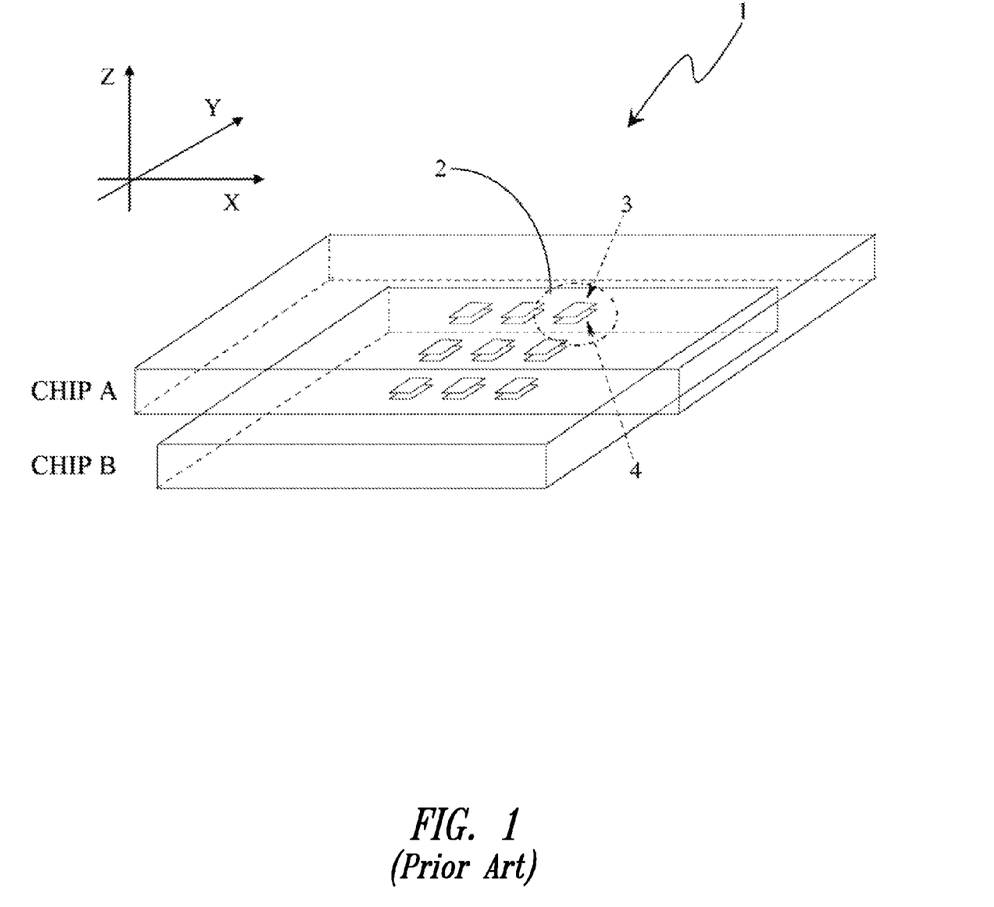
FIG. 1 shows a general scheme of a chip-to-chip communication system.

A chip-to-chip vertical communication system, based on contactless IO schemes exploiting capacitive coupling as an inter-chip channel, is shown for instance in FIG. 1. In particular, an upper metal layer of the technology process manufacturing the system is used to form a capacitive channel with the interposition of a dielectric, the chip-to-chip communication system being globally indicated at 1 and hereinafter briefly called the system 1.

As shown in FIG. 1, the system 1 comprises a plurality of communication units 2, each comprising a transmitter 3 and a receiver 4.

In particular, the transmitter 3 resides on a first chip A and the receiver 4 resides on a second chip B, the first and second chips A and B being assembled in a stacked or 3D configuration, the first chip A being on the top of chip B and the transmitter 3 and the receiver 4 being positioned on respective facing surfaces of the chips A and B, more particularly the transmitter 3 on a bottom surface of the chip A and the receiver 4 on a top surface of the chip B, with reference to an XYZ axis-system as shown in FIG. 1. Obviously, the above configuration (transmitter 3-chip A; receiver 4-chip B) is considered only as an example, a reverse configuration (transmitter 3-chip B; receiver 4-chip A) being also possible, the same consideration applying.

It should be emphasized that this approach benefits from on-chip communication circuits able to guarantee high performances, low power dissipation and reliable flexibility in data exchange.

Figure 2A:
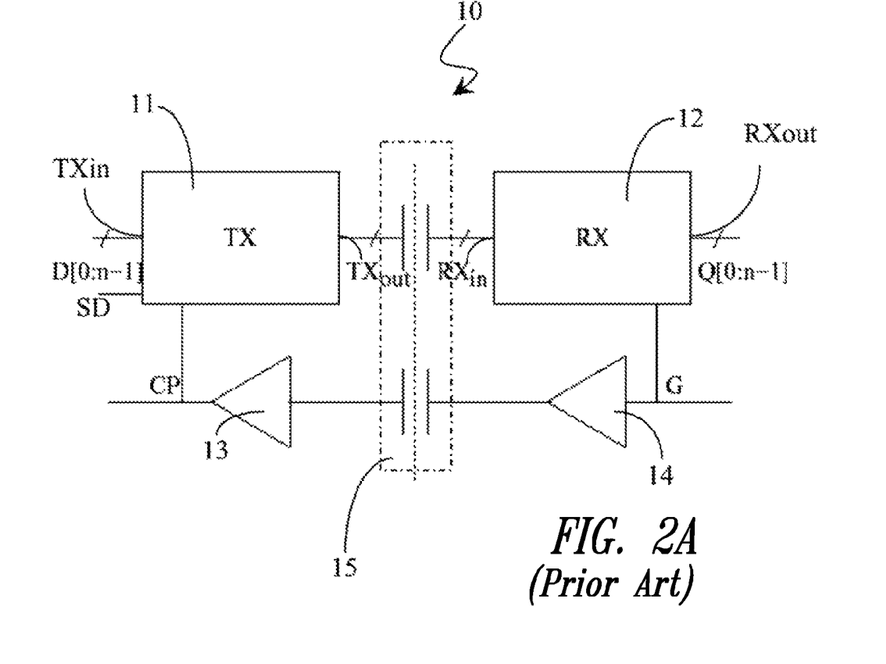
FIGS. 2A and 2B schematically show a chip-to-chip communication system realized according the prior art.
Figure 2B:
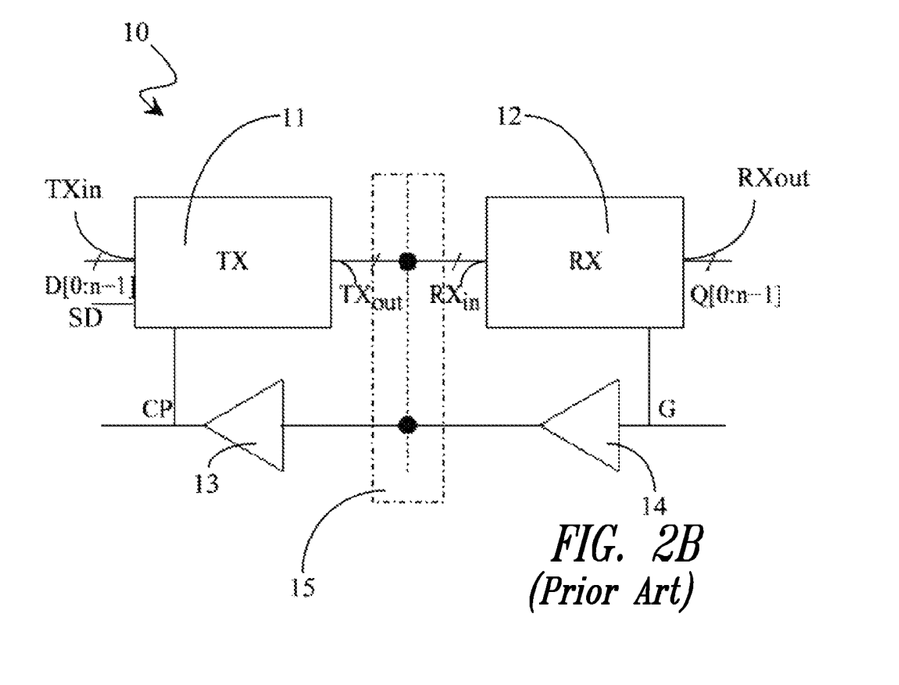

A chip-to-chip communication system, providing pre-charge and evaluation blocks within a transmitter TX and a receiver RX of the system, such transmitter and receiver having clock signals derived from a common clock signal is also described in the U.S. Patent Application Publication No. 2007/092011, published on Mar. 14, 2007, assigned to STMicroelectronics, Srl, and schematically shown in FIGS. 2A and 2B.

The system 10 comprises the transmitter TX 11 and the receiver RX 12, connected to each other through a connection block 15. The connection block 15 is an inter-chip communication channel.

In particular, the transmitter TX 11 has an output terminal TXout connected to an input terminal RXin of the receiver RX 12 through the connection block 15.

The connection block 15 could be a capacitive connection block, as shown in FIG. 2A or an ohmic connection block, as shown in FIG. 2B.

The transmitter TX 11 also has an input terminal TXin receiving an input or data signal D. In a similar manner, the receiver RX 12 also has an output terminal RXout issuing an output signal Q. In particular, the input data signal D and the output signal Q are n-bit digital signals.

Furthermore, the receiver RX 12 is connected to a first terminal G, the reference G being indifferently used to indicate the terminal or the signal applied thereto, for sake of simplicity of description. In particular, G is the primary clock signal/terminal.

Also, the transmitter TX 11 is connected to a second terminal CP as well as to a third terminal SD, also in this case the references CP and SD being indifferently used to indicate the terminals or the signals applied thereto, for sake of simplicity of description. In particular, CP is the secondary clock signal/terminal and SD is the preset signal/terminal.

The first and second control terminals, G and CP, are connected to each other at the connection block 15 through a first 13 and a second buffer 14.

As already indicated, the transmitter TX 11 is associated with a first chip, conventionally indicated as chip A, referring back to FIG. 1, while the receiver RX 12 is associated to a second chip, conventionally indicated as chip B, the first and second chips, A and B, being assembled in a stacked or 3D configuration.

The primary clock signal G and the secondary clock signal CP are balanced clock trees used to synchronize a bus of the input data signal D. In particular, the primary clock signal G and the secondary clock signal CP are obtained by a same clock signal. In the example shown in FIGS. 2A and 2B, the secondary clock signal CP is the transmitter clock signal which is delayed with respect to the primary clock signal G, which is in turn the receiver clock signal. In this way, the secondary clock signal CP guarantees a correct functional synchronization between the transmitter TX 11 and the receiver RX 12, i.e., between the chips A and B. In order to achieve that, the clock signal is transmitted in the opposite direction of the input data signal D, i.e., from the data receiver chip B to the data transmitter chip A.

So, the input data signal D flows from the first chip A to the second chip B, while the clock signals CP and G flow from the second chip B to the first chip A. In summary, the input data signal D and the clock signals CP and G flow in opposite directions.

Even advantageously under several aspects, also this known system require the definition of a dedicated clock channel apt to make the two chips isochronous and in phase to each other in order to ensure a correct working.

BRIEF SUMMARY

One embodiment is a synchronizer for a chip-to-chip communication system having structural and functional characteristics which allows to overcome the limits which still affect the devices realized according to the prior art.

One embodiment is a synchronizer comprising at least one synchronization block within each of the transmitter and the receiver of a chip-to-chip communication system as well as a pattern generation block within the synchronization blocks in order to generate suitable test pattern signals to be transmitted and received by the synchronization blocks, a synchronization thereof corresponding to a match condition between the transmitted and received test pattern signals.

One embodiment is a communication system between first and second independently clocked devices comprising, for each device, at least a transmitter and a receiver connected to each other in a crossed way in correspondence of an inter-chip communication channel. Advantageously, the system further comprises a synchronizer in turn including at least a first and a second synchronization block, having respective input terminals connected to said receivers and respective output terminals connected to said transmitters and comprising at least:
    a test pattern generator in order to generate a programmable test pattern signal;
    comparison means to check a matching between stored and received test pattern signals and thus lock corresponding clock phases of said synchronization blocks in case of positive result of said check; and
    a delay block able to change said clock phases until a synchronized condition of said synchronization blocks is verified, said synchronized condition corresponding to a matching between stored and received test pattern signals.

One embodiment is a method for synchronizing first and second independently clocked devices by using a synchronizer including at least a first and a second synchronization block, connected to receivers and transmitters of said first and second independently clocked devices. Advantageously, the method comprises:
    a preliminary phase wherein said first and second devices are set in a bias mode and
    a synchronization phase comprising the following steps:
    an initial step wherein a programmable first test pattern signal is transmitted from said first device to said second device;
    an evaluation step wherein the received first test pattern signal is compared with a stored test pattern signal, a matching between said stored and received first test pattern signals corresponding to a correct overlap of corresponding clock phases of said first and second devices; and
    if said evaluation step gives a positive result, said received test pattern signal matching with said stored test pattern signal:
    a locking step wherein said clock phase of said synchronization block of said second device is locked;
    otherwise, if the evaluation step gives a negative result, said received test pattern signal not matching with said stored test pattern signal:
    a programming step wherein said clock phase of said synchronization block of said second device is changed and said evaluation step is performed again until it gives a positive result and said clock phase of said synchronization block of said second device is locked, thus allowing a correct locking in a first transmission direction.

The characteristics and advantages of the communication system and of the method will be apparent from the following description of an embodiment thereof given by way of indicative and non-limiting example with reference to the annexed drawings.

DETAILED DESCRIPTION

With reference to such figures, and in particular to FIG. 3, a communication system between independently clocked devices, in particular chips, globally indicated at 30, hereinafter briefly called the system 30.

Figure 3:
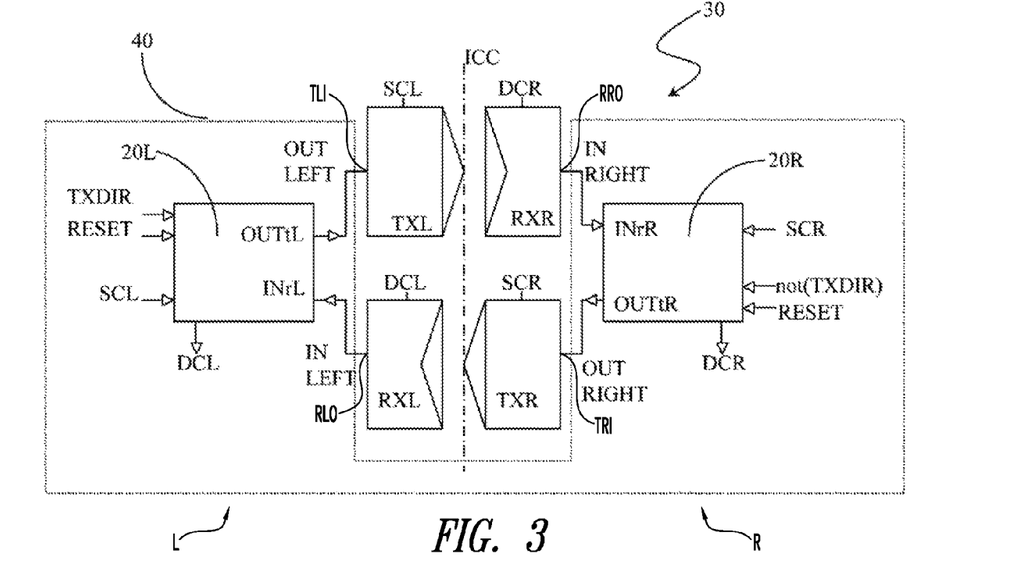
FIG. 3 schematically shows a communication system realized according to one embodiment.

The system 30 provides for the communication between a first or left chip (L) and a second or right chip (R) and comprises, for each chip, a transmitter, TXL and TXR, and a receiver, RXL and RXR, connected to each other in a crossed way in correspondence of an inter-chip communication channel ICC, indicated with a dotted line in FIG. 3. In particular, the transmitter TXL of the left chip L is connected to the receiver RXR of the right chip R and, similarly, the transmitter TXR of the right chip R is connected to the receiver RXL of the left chip L.

The transmitters TXL and TXR also have respective clock terminals receiving system clock signals SCL and SCR, while the receivers RXL and RXR have respective clock terminals receiving delayed clock signals DCL and DCR. For sake of simplicity of description, such references will be indifferently used to indicate the terminals or the signals applied thereto and the final letter "L" will be used to refer to the first or left chip L, while the final letter "R" will refer to the second or right chip R.

Advantageously, the system 30 also comprises a synchronizer 40 in turn including at least a first and a second synchronization block, 20L and 20R, connected to the receivers and transmitters, RXL, RXR and TXL, TXR, of the first and second chips, L and R, respectively.

In particular, the transmitters TXL and TXR have respective input terminals TLI, TRI connected to respective output terminals, OUTtL and OUTtR, of the corresponding synchronization block, 20L and 20R, while the receivers RXL and RXR have respective output terminals RLO, RRO connected to respective input terminals, INrL and INrR, of the corresponding synchronization block, 20L and 20R, for the transmission and reception of corresponding signals, indicated respectively as OUT LEFT, OUT RIGHT, IN LEFT and IN RIGHT.

More in particular, from left to right, the first or left synchronization block 20L, has a first clock terminal receiving a left system clock signal SCL as well as a second clock terminal producing a left delayed clock signal DCL, has a first enabling terminal receiving a reset signal RESET and a second enabling terminal receiving a control signal TXDIR, in particular a transmission direction signal, as well as an output terminal OUTtL connected to the left transmitter TXL and providing thereto the first output signal OUT LEFT.

The left transmitter TXL is connected, through the inter-chip communication channel ICC, to the right receiver RXR, in turn connected to the input terminal INrR of the second or right synchronization block 20R. The first input signal IN RIGHT is received to such input terminal INrR.

The right synchronization block 20R, which has a first clock terminal receiving a right system clock signal SCR as well as a second clock terminal producing a right delayed clock signal DCL, has a first enabling terminal receiving the reset signal RESET and a second enabling terminal receiving a negated value of the control signal, not(TXDIR).

In a similar manner, from right to left, the right synchronization block 20R has an output terminal OUTtR connected to the left transmitter TXR and providing thereto the second output signal OUT RIGHT.

The right transmitter TXR is connected, through the inter-chip communication channel ICC, to the left receiver RXL, in turn connected to the input terminal INrL of the left synchronization block 20L. The second input signal IN LEFT is received to such input terminal INrL.

As will be clear from the following description, a test pattern signal is generated on each chip and transmitted therefrom (OUT LEFT, OUT RIGHT) and received by the other one (IN RIGHT, IN LEFT), a comparison between stored and received test pattern signals allowing a synchronized condition of the synchronization blocks, 20L and 20R, to be guaranteed.

Figure 4:
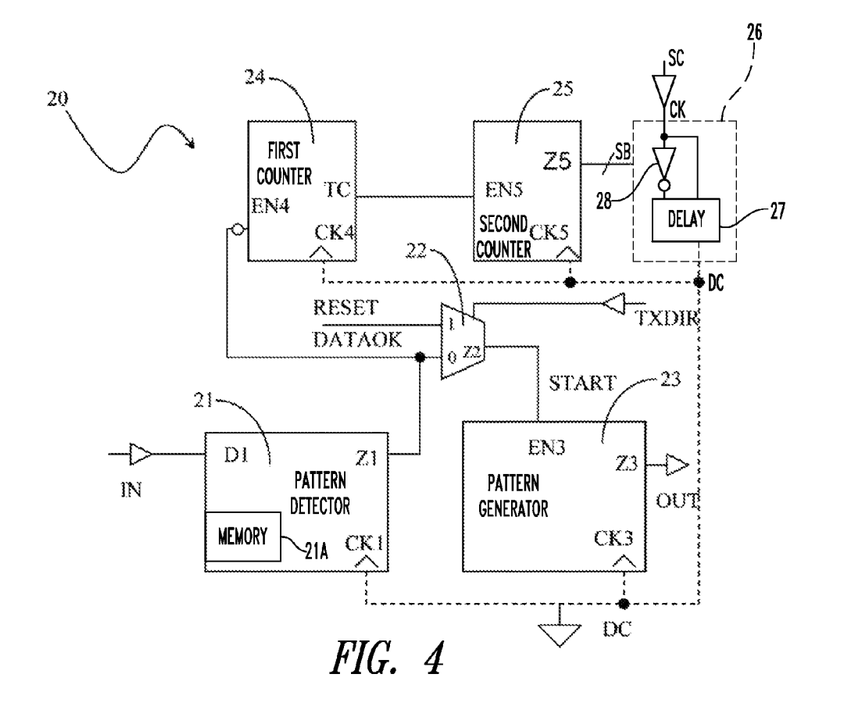
FIG. 4 schematically shows a detail of a synchronizer for a communication system according to one embodiment.

A synchronization block according to one embodiment is shown in greater detail in FIG. 4, globally indicated at 20.

In particular, the synchronization block 20 comprises a pattern detector 21 having an input terminal D1 connected to an input terminal IN of the synchronization block 20 and receiving therefrom an input or data signal. The pattern detector includes a memory 21A that stores one or more test pattern signals for comparison with the incoming test pattern signal received at the input terminal D1 from the corresponding receiver (RXL or RXR).

The pattern detector 21 also has a clock terminal CK1 receiving a delayed clock signal DC and an output terminal Z1 connected to a first input terminal of a comparator 22, and providing thereto a first internal check signal DATAOK. The comparator 22 has in turn a second input terminal receiving the reset signal RESET and an enabling terminal EN2 receiving the control signal TXDIR as well as an output terminal Z2 connected to an enabling terminal EN3 of a pattern generator 23 and providing thereto a second internal check signal START.

Advantageously, the reset signal RESET is an external reset signal applied to the corresponding chip (L or R) and the control signal TXDIR is a signal defining the direction of the transmission (left-to-right or right-to-left). It is clear that when a chip, for instance chip L, is in a transmit mode, the other one, i.e., chip R, should be in the receive mode, so that such a control signal TXDIR is in the inverted form with respect to the other one (indicated as not(TXDIR) in FIG. 3).

Advantageously, the pattern generator 23 provides test pattern signals. Moreover, the pattern detector 21 and the comparator 22 realize comparison means to check a matching between the stored and received test pattern signals and thus lock corresponding clock phases of the synchronization blocks in case of positive result of this check.

The pattern generator 23 also has a clock terminal CK3 receiving the delayed clock signal DC and an output terminal Z3 connected to an output terminal OUT of the synchronization block 20.

Advantageously, the synchronization block 20 also comprises a first and a second counter, 24 and 25, and a delay block 26 connected, in cascade to each other, between the first input terminal of the comparator 22 and a clock terminal CK of the synchronization block 20 which receives a system clock signal SC.

In particular, the first counter 24 has an enabling terminal EN4 connected to the output terminal Z1 of the pattern detector 21 and an output terminal or terminal counter TC connected to an enabling terminal EN5 of the second counter 25, in turn having an output terminal Z5 connected to an input terminal or select bit SB of the delay block 26. Advantageously, the first and second counters, 24 and 25 are counters with a programmable base depending on the transmission direction.

Moreover, the delay block 26 also has an input terminal connected to the clock terminal CK of the synchronization block 20 and an output terminal at which the delayed clock signal DC is produced.

Finally, the first counter 24 and the second counter 25 have respective clock terminals, CK4, CK5 receiving the delayed clock signal DC that is output by the delay block 26.

Advantageously, the delay block 26 comprises a programmable delay block 27 and an inverter 28 in order to generate all the possible overlappings of the two clock phases so that at least one combination of the two overlapped phases generates a correct inter-chip communication, as will be clear from the following description.

Figure 5:
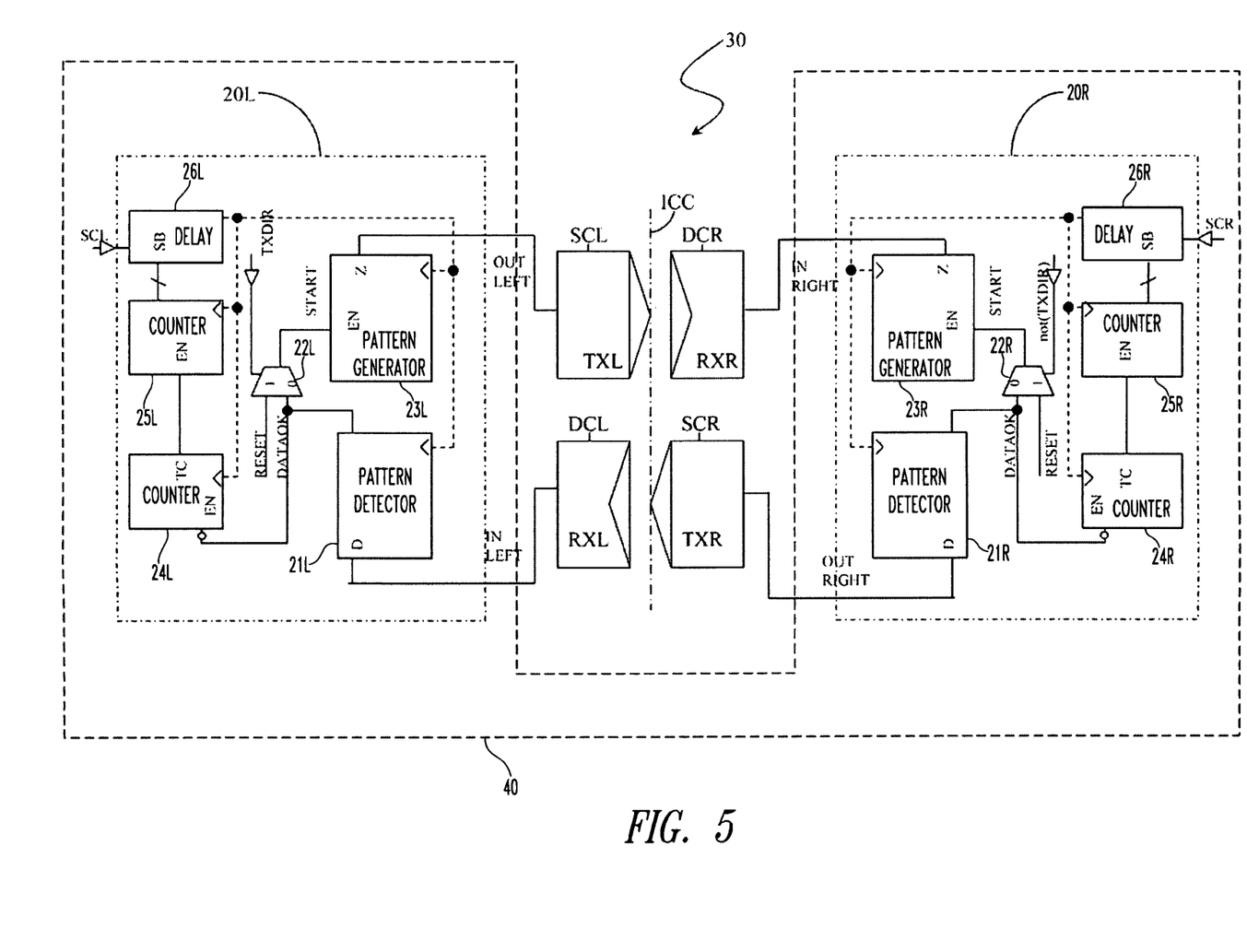
FIG. 5 schematically shows in greater detail the communication system of FIG. 3.

A chip-to-chip communication system 30 comprising a synchronizer 40 in turn including at least a first or left synchronization block 20L (including blocks 21L-26L corresponding to blocks 21-26) and a second or right synchronization block 20R (including blocks 21R-26R corresponding to blocks 21-26) having the above described internal structure is shown in FIG. 5.

In order to more clearly understand the communication system 30 and the synchronizer 40, an explanation of the operation thereof will be given in the following line.

As a staring condition, it is assumed that the control signal TXDIR has a first or high value (TX DIR=1), corresponding to a condition wherein the left chip L is ready to transmit a signal (after a reset phase) and the right chip R is ready to receive.

In this case, the pattern generator 23L of the corresponding left synchronization block 20L is enabled, and it is clocked with the delayed clock signal DC that is initially equal to the system clock signal SC. Moreover, the second internal check signal START is set equal to the reset signal RESET.

Advantageously, a programmable test pattern signal is transmitted from one chip, in particular the left one, to the other, in particular the right one. It is thus clear that only if the corresponding clock phases correctly overlap, the second chip receives the test pattern signal the right way.

In particular, advantageously, the pattern detector 21R of the synchronization block 20R of the right chip R receives the test pattern signal as transmitted by the transmitter TXL of the left chip L and compares the received test pattern signal with a test pattern signal stored in the pattern detector. If the clock signals (left and right delayed clock signals DCL and DCR) are correctly overlapped, the pattern detector 21R determines that the received and stored test pattern signals match, and raises the first internal check signal DATAOK.

If the left and right delayed clock signals DCL and DCR do not correctly overlap, then the pattern detector 21R will determine that the received and stored test pattern signals do not match, and will not output the DATAOK signal at the output Z1 (effectively output a DATANOTOK signal). The DATANOTOK signal enables the first counter 24R to start counting. The embodiment of FIG. 4 shows the enable input EN4 as negated, so that it is enable by the DATANOTOK signal being at a low logic level. Of course, the first counter 24 could be enabled by a DATANOTOK signal at a high level if the enable input EN4 is not negated. When the terminal count TC of the first counter 24R of the right synchronization block 20R is reached, the enable terminal EN5 of its second counter 25R is activated, so that the select bits SB are incremented.

The configuration of the select bits SB corresponds for instance to the following mapping:

| | |
|---|---|
| SB = 00 | nothing |
| SB = 01 | delay |
| SB = 10 | delay plus inversion |
| SB = 11 | inversion. |

In this way, a delay is entered by the right delay block 26R after a first iteration of the transmission between the chips L and R: that permits to modify the phase of the delayed clock signal DCR and consequently the mutual overlapping of the clock phases until they match.

The delay block 26R has a different working depending on a value of SB provided by the second counter 25R to its input terminal according to the above mapping.

The same procedure is repeated until the transmitted signal is correctly interpreted by the pattern detector 21R of the synchronization block 20R of the right chip R. When that occurs, the first internal check signal DATAOK is raised, with a double effect:

the first counter 24R of the synchronization block 20R of the right chip R is disabled, so that the delay of the delayed clock signal DCR of the right chip R is locked, and the pattern generator 23R of the synchronization block 20R of the right chip R is enabled by the START signal produced by the comparator 22R.

At this time, a further programmable test pattern signal is transmitted in a reverse way, from the right chip R to the left chip L and the above check on the correct transmission is performed, until also the delay of the delayed clock signal DCL of the left chip L is locked.

Only after such locking phases, the communication system 30 switches from a bias mode to an operative mode and allows a correct inter-chip communication.

The synchronizer 40, and in particular the programmable delay block 27 and inverter 28 are able generate all the possible overlappings of the two clock phases so that at least one combination of the two overlapped phases generates a correct inter-chip communication.

One embodiment is a method for synchronizing two independently clocked devices, in particular chips of a stacked configuration, by using a synchronizer 40 including at least a first and a second synchronization block, 20L and 20R, connected to the receivers and transmitters, RXL, RXR and TXL, TXR, of a first and second independently clocked devices, L and R, as above described. In an initial condition, it is assumed that the first device L is ready to transmit the second device R is ready to receive.

Advantageously, the method comprises a preliminary phase wherein the first and second devices are set in a bias mode and a synchronization phase is performed.

In particular, the synchronization phase comprises the following steps:

an initial step wherein a programmable test pattern signal is transmitted from the first device to the second one;

an evaluation step wherein a received test pattern signal is compared with a stored one, the match between such stored and received test pattern signals corresponding to a correct overlap of the corresponding clock phases of these devices; and if the evaluation step gives a positive result, i.e., if the received test pattern signal matches with the stored one, a locking step wherein the clock phase of the synchronization block of the second device is locked;

otherwise, if the evaluation step gives a negative result i.e., if the received test pattern signal does not match with the stored one, a programming step wherein a clock phase of the synchronization block of the second device is changed and the evaluation step is performed again until it gives a positive result and the clock phase of the synchronization block of the second device is locked, thus allowing a correct locking in a first transmission direction.

Moreover, the method provides that the above sequence of phases are repeated for the transmission of the same test pattern signal from the second device to the first one until also the clock phase of the synchronization block of the first device is locked, thus allowing a correct locking also in a second transmission direction, opposite to the first one.

Only after the clock phases of the first and second devices have been locked, the method further comprises a switching phase wherein the devices switch from a bias mode to an operative mode and a signal is transmitted between these clocked devices, a correct synchronization of the two independently clocked devices having been ensured by the locking steps.

The proposed method is particularly advantageous in case of chips in a stacked or 3D configuration.

The communication system includes a first and a second device, in particular chips, and a synchronizer in order to ensure a correct lock of the clock phases of the devices in correspondence of an overlapping between these clock phases.

In particular, a preliminary phase wherein a programmable test pattern signal is transmitted from a first chip to a second one is provided and, if the clock phases of the two chips are correctly overlapped, the second chip receives the test pattern signal the right way. This is verified by means of simple matching between stored and received test pattern signals and by locking a corresponding clock phase of the second chip.

Moreover, the preliminary phase also provides a reverse transmission of a same test pattern signal from the second chip to the first one, a matching between stored and received test pattern signals ensuring a correct lock of a corresponding clock phase of the first chip.

A further advantage is that a programmable delay and an inverter are used in order to generate all the possible overlappings of the two clock phases so that at least one combination of the two overlapped clock phases generates a correct inter-chip communication.

It is to be remarked that, there is no need of sharing a common synchronization signal, thus overcoming the problems related to the definition of a dedicated clock channel, still affecting the known communication systems.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A communication system, comprising:
an inter-device communication channel; and
first and second devices coupled to one another by the inter-device communication channel and configured to be independently clock, each device including a transmitter, a receiver, and a synchronization block that includes:
an input terminal coupled to said receiver of the device;
an output terminal coupled to said transmitter of the device;
a clock terminal;
a test pattern generator structured to generate a test pattern signal;
a pattern detector configured to check a matching between a received test pattern signal and a stored test pattern signal, said pattern detector having an input terminal configured to receive the received test pattern signal, a memory configured to store the stored test pattern signal, and an output terminal, the pattern detector being configured to compare the received and stored test pattern signals and lock a clock phase of said synchronization block by providing a first internal check signal indicative of whether the received test pattern signal matches the stored test pattern signal;
a comparator having a first input terminal coupled to the output of the pattern detector, a second input terminal configured to receive a reset signal, and an output terminal configured to provide a second internal check signal;
a delay block coupled to the clock terminal and structured to change said clock phase of the synchronization block until a synchronized condition of said synchronization blocks is verified, said synchronized condition corresponding to a matching between the stored and received test pattern signals; and
a first counter and a second counter coupled, in cascade to each other, between said first input terminal of said comparator and said delay block, the first counter having an enabling terminal coupled to said output terminal of said pattern detector and configured to receive said first internal check signal from said pattern detector.

2. The communication system according to claim 1, wherein:
said synchronization blocks have respective enabling terminals respectively configured to receive opposite first and second transmission direction signals, respectively;
the synchronization block of said first device is configured to, in response to the first transmission direction signal, check a matching between a first stored test pattern signal and a first received test pattern signal transmitted in a first transmission direction; and
the synchronization block of said second device is configured to, in response to the first transmission direction signal, check a matching between a second stored test pattern signal and a second received test pattern signal transmitted in a second transmission direction that is opposite to the first transmission direction.

3. The communication system according to claim 2, wherein each comparator has an enabling terminal configured to receive one of said transmission direction signals.

4. The communication system according to claim 1, wherein said first and second counters are counters with a programmable base depending on said transmission direction.

5. The communication system according to claim 4, wherein said delay block comprises a programmable delay block and an inverter in order to generate all overlappings of two clock phases so that at least one combination of the two overlapped phases generates a correct communication between said devices.

6. The communication system according to claim 5, wherein the delay block has a different working depending on a value of a signal SB provided by said second counter to an input terminal of the delay block according to the following mapping:

| | |
|---|---|
| SB = 00 | nothing |
| SB = 01 | delay |
| SB = 10 | delay plus inversion |
| SB = 11 | inversion. |

7. A communication device, comprising:
a receiver having a signal input configured to receive a first test pattern signal from another, independently clocked device; and a synchronization block including:
  an input terminal coupled to said receiver;
  a pattern detector configured to check a matching between the received first test pattern signal and a stored test pattern signal, the pattern detector having an input terminal configured to receive the receive first test pattern signal, a memory configured to store the stored test pattern signal, and an output terminal, the pattern detector being configured to compare the received and stored test pattern signals and lock a clock phase of said synchronization block by providing a first internal check signal indicative of whether the received first test pattern signal matches the stored test pattern signal;
  a comparator having a first input terminal coupled to the output terminal of the pattern detector, a second input terminal configured to receive a reset signal, an enabling terminal configured to receive a transmission direction signal, and an output terminal configured to provide a second internal check signal; and
  a delay block structured to change said clock phase of the synchronization block until a synchronized condition is verified, said synchronized condition corresponding to a matching between the stored and received first test pattern signals; and
a transmitter configured to transmit a second test pattern signal to the other, independently clocked device so that the other, independently clocked device can match the second test pattern signal with another stored test pattern signal, wherein said synchronization block includes a pattern generator coupled to the transmitter and configured to produce the second test pattern signal in response to be enabled by the second internal check signal.

8. The communication device according to claim 7, wherein said synchronization block has an enabling terminal configured to receive a transmission direction signal indicating whether the synchronization block is in a receiving mode or a transmitting mode.

9. The communication device according to claim 7, wherein the synchronization block further comprises a first and a second counter coupled, in cascade to each other, between said first input terminal of said comparator and said delay block of the synchronization block, the delay block being coupled to a clock terminal of said synchronization block, said output terminal of said pattern detector being coupled to an enabling terminal of said first counter and configured to provide said first internal check signal to the first counter.

10. The communication device according to claim 9, wherein said first and second counters are counters with a programmable base depending on a transmission direction.

11. The communication device according to claim 9, wherein said delay block comprises a programmable delay block and an inverter in order to generate all overlappings of two clock phases so that at least one combination of the two overlapped phases generates a correct communication between said devices.

12. The communication device according to claim 11, wherein the delay block has a different working depending on a value of a signal SB provided by said second counter to an input terminal of the delay block according to the following mapping:

| | |
|---|---|
| SB = 00 | nothing |
| SB = 01 | delay |
| SB = 10 | delay plus inversion |
| SB = 11 | inversion. |

13. A communication device, comprising:
a receiver having a signal input configured to receive a first test pattern signal from another, independently clocked device; and
a synchronization block including:
  an input terminal coupled to said receiver;
  a pattern detector configured to check a matching between the received first test pattern signal and a stored test pattern signal, the pattern detector having an input terminal configured to receive the receive first test pattern signal, a memory configured to store the stored test pattern signal, and an output terminal, the pattern detector being configured to compare the received and stored test pattern signals and lock a clock phase of said synchronization block by providing a first internal check signal indicative of whether the received first test pattern signal matches the stored test pattern signal;
  a comparator having a first input terminal coupled to the output terminal of the pattern detector, a second input terminal configured to receive a reset signal, an enabling terminal configured to receive a transmission direction signal, and an output terminal configured to provide a second internal check signal;
  a delay block structured to change said clock phase of the synchronization block until a synchronized condition is verified, said synchronized condition corresponding to a matching between the stored and received first test pattern signals; and
  a first counter and a second counter coupled, in cascade to each other, between said first input terminal of said comparator and said delay block of the synchronization block, the delay block being coupled to a clock terminal of said synchronization block, said output terminal of said pattern detector being coupled to an enabling terminal of said first counter and configured to provide said first internal check signal to the first counter.

14. The communication device according to claim 13, wherein said first and second counters are counters with a programmable base depending on a transmission direction.

15. The communication device according to claim 13, wherein said delay block comprises a programmable delay block and an inverter in order to generate all overlappings of two clock phases so that at least one combination of the two overlapped phases generates a correct communication between said devices.

16. The communication device according to claim 15, wherein the delay block has a different working depending on a value of a signal SB provided by said second counter to an input terminal of the delay block according to the following mapping:

| |
|---|
| SB = 00 nothing |
| SB = 01 delay |
| SB = 10 delay plus inversion |
| SB = 11 inversion. |

* * * * *